(12) United States Patent
Andersson et al.

(10) Patent No.: US 10,941,862 B2
(45) Date of Patent: Mar. 9, 2021

(54) SEALING CAP AND METHOD FOR MANUFACTURING A SEALING CAP

(71) Applicant: Trelleborg Sealing Solutions Kalmar AB, Kalmar (SE)

(72) Inventors: Jonas Karl-Gustaf Andersson, Kalmar (SE); Nils Marcus Olsson, Ljungbyholm (SE); Stig Reine Joakim Axelsson, Bergkvara (SE)

(73) Assignee: Trelleborg Sealing Solutions Kalmar AB, Kalmar (SE)

( * ) Notice: Subject to any disclaimer, the term of this patent is extended or adjusted under 35 U.S.C. 154(b) by 108 days.

(21) Appl. No.: 15/959,842

(22) PCT Filed: Nov. 10, 2016

(86) PCT No.: PCT/SE2016/051116
§ 371 (c)(1),
(2) Date: Apr. 23, 2018

(87) PCT Pub. No.: WO2017/082809
PCT Pub. Date: May 18, 2017

(65) Prior Publication Data
US 2018/0274676 A1    Sep. 27, 2018

(30) Foreign Application Priority Data

Nov. 10, 2015    (SE) .................................. 1551454-0

(51) Int. Cl.
*F16J 13/02* (2006.01)
*B65D 41/12* (2006.01)
(Continued)

(52) U.S. Cl.
CPC .............. *F16J 13/02* (2013.01); *B65D 41/12* (2013.01); *F02B 77/005* (2013.01); *F16J 15/121* (2013.01)

(58) Field of Classification Search
CPC .......... F16J 13/02; F16J 15/121; B65D 41/12; B65D 41/40; F02B 77/005;
(Continued)

(56) References Cited

U.S. PATENT DOCUMENTS 2,327,455 A    8/1943  Punte
2,829,790 A *  4/1958  Iscle-Aregger ........ B65D 41/12
                                                    215/250
(Continued)

FOREIGN PATENT DOCUMENTS

CN    1119787 A    4/1996
DE    1038934      9/1958
(Continued)

OTHER PUBLICATIONS

Young's Modulus Scale. Daalkhaijav, Uranbileg. Rheological Techniques in Characterization and Aiding in the Modification of Soft Matter. 10.13140/RG.2.2.27762.61122. https://www.researchgate.net/figure/a-Scale-of-Youngs-modulus-E-values-of-common-materials-These-materials-fall-under_fig1_325593461 (Year: 2018).*

*Primary Examiner* — James N Smalley
(74) *Attorney, Agent, or Firm* — Pierce Atwood LLP; Kevin M. Farrell; Christopher A. Baxter (57) ABSTRACT

Sealing caps and method for manufacturing such sealing caps are presented wherein the sealing cap has a body (1) with a U-shaped profile with a base (9) and a perimeter wall (7) wherein the outside of the body is coated with a layer of an elastic material (5) and wherein the base is provided with a continuous convex ridge (12) adjacent the perimeter wall.

21 Claims, 4 Drawing Sheets

(51) Int. Cl.
*F02B 77/00* (2006.01)
*F16J 15/12* (2006.01)

(58) Field of Classification Search
CPC . B32B 2311/30; B32B 2311/24; B32B 38/00; B32B 15/08; B32B 15/06
USPC .................................................. 215/328, 305
See application file for complete search history.

(56) References Cited

U.S. PATENT DOCUMENTS

| | | | |
|---|---|---|---|
| 3,147,875 A * | 9/1964 | Rutledge, Sr. | B65D 41/12 215/328 |
| 3,207,350 A * | 9/1965 | Hagmann | B65D 41/12 215/328 |
| 3,635,369 A | 1/1972 | Lasswell et al. | |
| 3,817,540 A | 6/1974 | Nicholson | |
| 3,851,794 A | 12/1974 | Hehl | |
| 4,562,930 A * | 1/1986 | Lecinski, Jr. | B65D 41/0457 215/44 |
| 4,627,548 A * | 12/1986 | Thompson | B65D 41/0464 215/295 |
| 5,316,045 A | 5/1994 | Taylor | |
| 5,393,076 A | 2/1995 | Hagiwara et al. | |
| 5,474,194 A | 12/1995 | Heilman et al. | |
| 5,597,422 A | 1/1997 | Kataoka et al. | |
| 7,621,568 B2 | 11/2009 | Schroeder et al. | |
| 9,415,905 B1 * | 8/2016 | Gilliam | B65D 41/42 |
| 2005/0061766 A1 * | 3/2005 | Jochem | B29C 37/0085 215/305 |
| 2007/0186614 A1 | 8/2007 | Pinard | |
| 2008/0073312 A1 * | 3/2008 | Babcock | B65D 41/0485 215/305 |
| 2009/0084753 A1 * | 4/2009 | Ramos | B29C 45/1418 215/346 |
| 2009/0236353 A1 | 9/2009 | Martin et al. | |
| 2010/0326949 A1 * | 12/2010 | Merino Caballero | B65D 41/12 215/316 |

FOREIGN PATENT DOCUMENTS

| | | |
|---|---|---|
| DE | 1038934 B | 9/1958 |
| EP | 0942205 A1 | 9/1999 |
| EP | 1296038 A2 | 3/2003 |
| FR | 2114413 | 6/1972 |
| JP | 51105964 | 8/1976 |
| JP | 03250085 A | 11/1991 |
| JP | 3-127862 | 12/1991 |
| JP | 0988980 A | 3/1997 |
| JP | 2011149529 A | 8/2011 |
| JP | 2014534379 A | 12/2014 |
| WO | 9200891 A1 | 1/1992 |
| WO | 2008044363 A1 | 4/2008 |
| WO | 2015022642 A1 | 2/2015 |

* cited by examiner

SEALING CAP AND METHOD FOR MANUFACTURING A SEALING CAP

BACKGROUND OF THE INVENTION

Sealing caps are cupped circular metal products with flat base and a raised circumferential wall which forms a U-shaped profile. Some conventional sealing caps are intended to be pressed with an interference fit into a corresponding hole in an object in order to form an airtight or watertight seal. An example of a sealing cap is a plug which is used to seal holes in the walls of the casing of machinery, for example the cam shaft holes in a cylinder head. The plug is an interference fit and prevents contaminants from entering the cylinder head casing and oil from leaking from the casing.

Some types of conventional sealing cap are made of thick, stiff stamped metal as is known from the standard DIN443 for sealing plugs and, due to the interference with the inner walls of the hole being plugged, are permanently deformed and/or deform the walls of the hole with the risk of cracking during fitting or use. Such metal sealing caps are cheap to produce and provide reliable sealing but have certain disadvantages, for example, they may rust in place, there may be galvanic reaction between the plug and the wall of the hole, and they are difficult to remove. Furthermore in some applications they need to be glued into place which is undesirable in modern manufacturing processes.

Other types of conventional sealing caps are made of a stamped steel body of a thickness of the order of 0.8 mm which is subsequently coated by injection moulding on the external surfaces with a rubber layer having a thickness of the order of 0.8 mm. These sealing caps have a flat base and the steel is intended to give the sealing cap the required stiffness while the rubber is intended to provide the resilient characteristics necessary to give the required sealing properties. This provides good sealing performance but such metal rubber plugs are expensive to manufacture as the plugs are injection moulded individually, they may require extensive and expensive machining of the surface to which they are mated in order to give a good seal and to reduce the risk of abrasion damage to the rubber during insertion of the plug, and they may leak as they age as the rubber suffers from compression set and gradually loses the resiliency necessary to form the seal against the surface of the hole in which they are in contact. The metal of the sealing cap does not provided any significant resilient lateral forces which contribute to holding the sealing cap in place—in the absence of the rubber coating the metal body would be a loose fit in the hole.

BRIEF DESCRIPTION OF THE INVENTION

The present invention relates to sealing caps which present advantages over sealing caps known in the prior art. A sealing cap according to the present invention comprises a body with a corrugated base made of an elastically-deformable substrate having a first Young's modulus and a layer of a resilient material (i.e. a material able to return to an original shape after being pulled, stretched, pressed, bent, etc.) with a second, lower Young's modulus coating some or all of the exterior surface. Typically the substrate can be made of a metal such as aluminium or aluminium alloy or steel or other metal, and the elastic material can be a resilient material such as rubber. The present invention also relates to methods for manufacturing such sealing caps, wherein the method comprises coating a substrate in the form of sheet of elastically-deformable material such as steel or aluminium with layer of an elastic material such as rubber on at least one side and then forming appropriately shaped sealing caps.

BRIEF DESCRIPTION OF THE DRAWING

FIG. 2a) shows a perspective view of a third embodiment of a sealing cap according to the invention FIG. 2b) shows a lateral view of the sealing cap of FIG. 2a).

FIG. 2d) shows an enlarged view of a portion of the sealing cap of FIG. 2a).

FIGS. 4a) to 4c) show respectively a lateral view, a perspective view, and a cross-sectional view through a further embodiment of a sealing cap in accordance with the present invention.

FIG. 4d) shows an enlarged view of the upper end of the perimeter wall of the sealing cap of FIGS. 4a) to 4d).

FIG. 4e) shows an enlarged view of a further embodiment of an upper end of the perimeter wall of the sealing cap.

FIG. 4f) shows an enlarged view of another embodiment of an upper end of the perimeter wall of the sealing cap.

FIG. 4g) shows an enlarged view of yet another embodiment of an upper end of the perimeter wall of the sealing cap.

DETAILED DESCRIPTION OF THE INVENTION

Figure 1A:
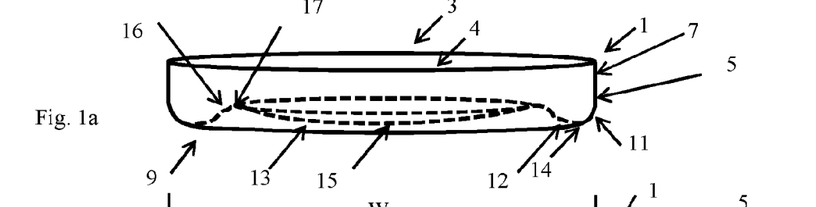
FIG. 1a) shows a perspective view of a first embodiment of a sealing cap according to the invention.

A sealing cap 1 according to the first embodiment of the invention is shown in FIGS. 1a) to 1d). Sealing cap 1 comprises a cup or bowl-shaped (i.e. having a U-shaped profile) body 3 made of an elastically-deformable substrate 4 such as aluminium or steel with a first Young's modulus. Body 3 has a vertical perimeter wall 7 of outer diameter W and of height H. The base of perimeter wall 7 continues by means of a preferably curved transition portion 11 of radius R towards the centre of the sealing cap to form a corrugated base 9 of diameter B (which in this example is the same as W). At least the exterior surface of the wall is coated with a layer of a resilient coating 5 having a second, lower Young's modulus.

Figure 1B:
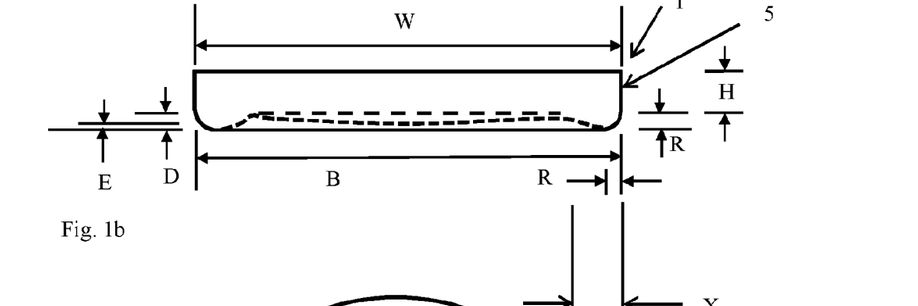
FIG. 1b) shows a lateral view of the sealing cap of FIG. 1a).
Figure 1C:
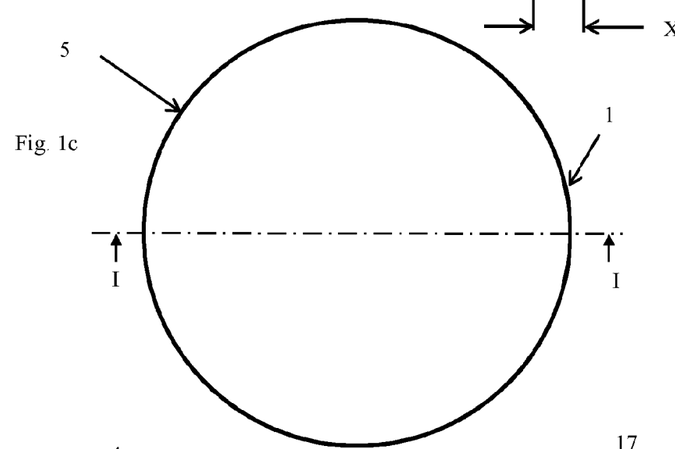
FIG. 1c) shows a plan view from below of the sealing cap of FIG. 1a).
Figure 1D:
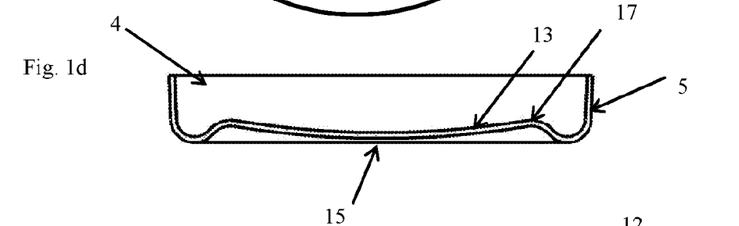
FIG. 1d) shows a section along line I-I of FIG. 1c).

As can be seen in the views of FIGS. 1a) and 1b) the corrugated base 9 has a corrugated profile formed of concentric convex ridges 12, 13 having peaks 14, 15, which ridges are separated by a concentric concave trough 16 with a bottom 17. Bottom 17 has a maximum depth D (which in this embodiment of the invention is equal to R) into the interior of the sealing cap at a distance X from the wall of the sealing cap. The centre of the base is convex as ridge 13 continues towards the centre of the base from bottom 17 of trough 16 and has its peak 15 at the centre of the base.

The outermost convex ridge 12 is preferably immediately adjacent the wall 7 (and is contiguous with it) and surrounds and merges, preferably smoothly, with the trough 16 which surrounds and merges, preferably smoothly with the domed-shaped ridge 13. The peak 15 of the dome-shaped ridge 13 does not extend to the plane of the peak 14 of outer ridge 12 but stops at a distance E from this plane. In the embodiment of the invention shown in FIGS. 1a) to 1d) when seen from the side the body has a flattened U-shaped profile with a base that comprises at least a perimeter wall joined to one ridge which is separated from a domed central portion by a trough. In this embodiment of the invention the perimeter wall is substantially perpendicular to the base, thus the height of the sealing cap is H+R, and the width W of wall of the sealing cap is equal to the width B of the base. Preferably in every embodiment of the invention, in order to provide the sealing cap with a stable base when placed base downwards on a flat surface, no corrugation or peak extends out of the plane of the deepest portion of the outermost ridge 12.

Figure 1E:
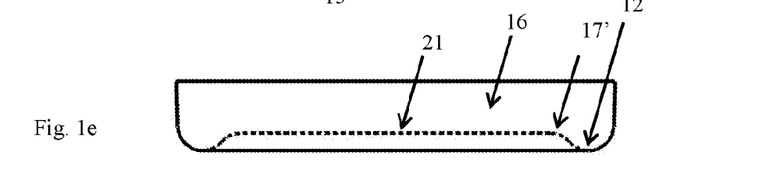
FIG. 1e) shows a lateral view of a second embodiment of a sealing cap according to the invention.

FIG. 1e) shows an example of a sealing cap in which the outer convex ridge 12 surrounds a trough 16, the bottom 17' of which extends to the centre of the base as a substantially flat surface 21.

Figures 2A, 2B, 2D:
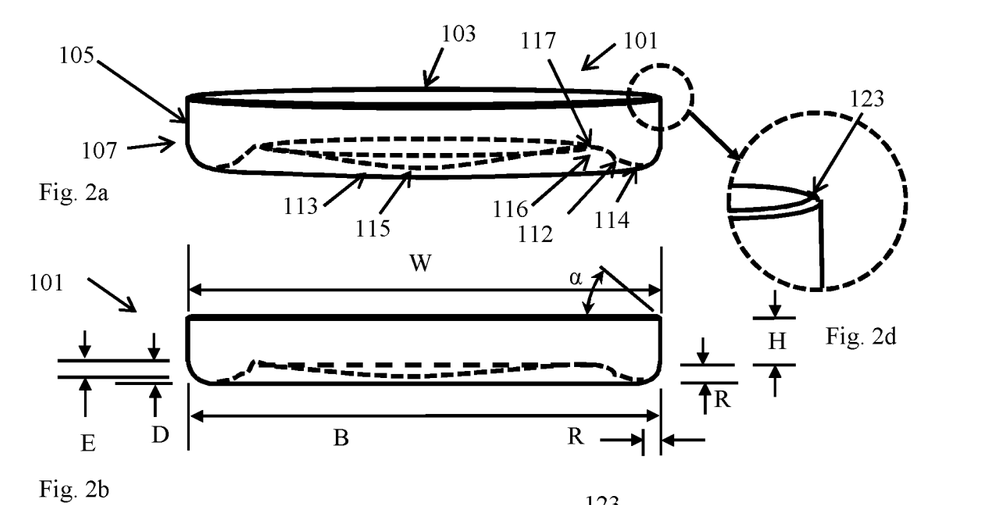
Figure 2C:
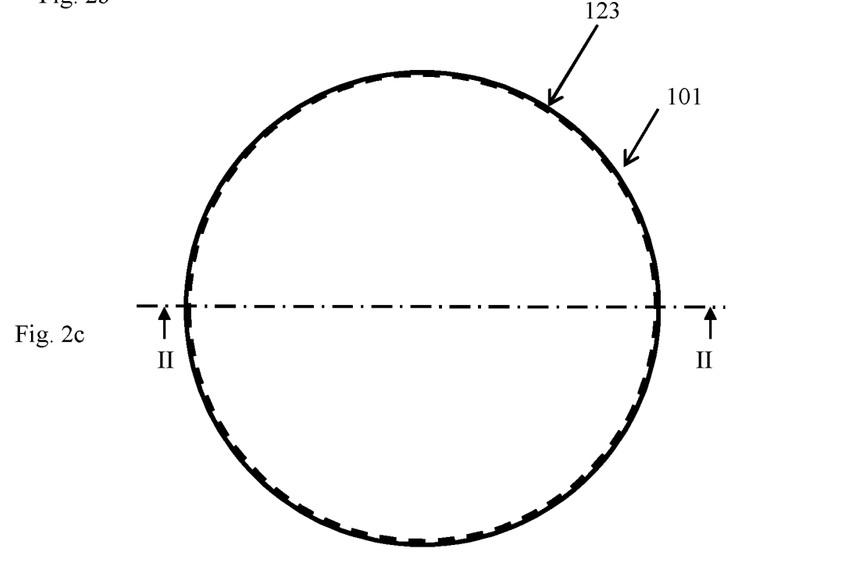
FIG. 2c) shows a plan view from below of the sealing cap of FIG. 2a).
Figure 2E:
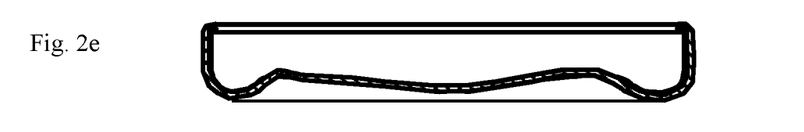
FIG. 2e) shows a section along line II-II of FIG. 2c).

FIGS. 2a) to 2d) show a second embodiment of a sealing cap according to the invention. In this embodiment of the invention the body 103 of the sealing cap 101 is provided with a inwardly facing lip 123 on the open end of the perimeter wall 107 in addition to an arrangement of convex ridges 112, 113 and concave trough 116 with respective peaks 114, 115 and bottom 117 in the base. Lip 123 projects away from a plane parallel to the base at an angle α wherein α is greater than 0 degrees and less than 90 degrees. Preferably α is greater than 30 degrees and less than 80 degrees and most preferably is greater than 45 degrees and less than 75 degrees. Lip 123 can be formed in a second forming operation after the cap has been stamped out. Lip 123 facilitates insertion of a cap seal into a hole when the sealing cap is inserted with the lip first. Lip 123 also can be gripped by any suitable tool to aid removal of the sealing cap from a hole. Such a lip can be used in combination with any variation of the base described herein.

Figure 3A:
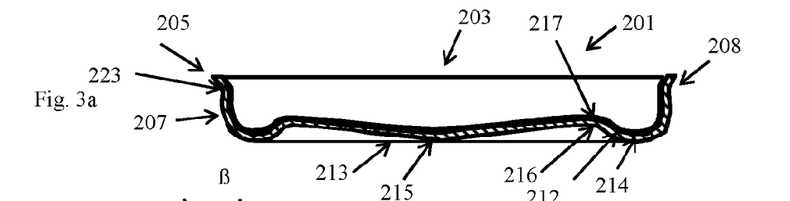
FIG. 3a) shows a section through a further embodiment of a sealing cap according to the invention.

FIG. 3a) shows a further embodiment of a sealing cap in accordance with the present invention in which the sealing cap 201 is provided with a perimeter wall 207 which leans at an angle β outwards at the open end 208 in addition to an arrangement of convex ridges 212, 213 and concave trough 216 with respective peaks 214, 215 and bottom 217 in the base. This forms a lip or collar 223 which can be used to seal against a bevelled perimeter of the hole in which it is fitted and reduce the collection of dirt in the perimeter. This lip can be used in combination with any variation of the base described herein.

Figure 3B:
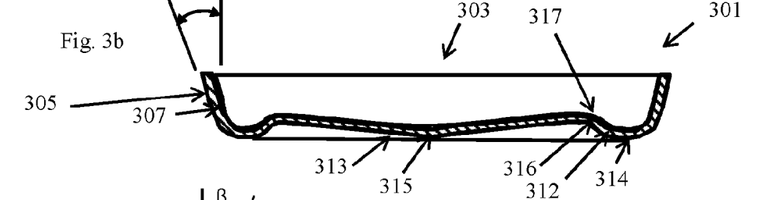
FIG. 3b) shows a section through yet a further embodiment of a sealing cap according to the invention.

FIG. 3b) shows a further embodiment of a sealing cap in accordance with the present invention in which the sealing cap 301 is provided with a perimeter wall 307 which tapers outwards from the base 309 in addition to an arrangement of convex ridges 312, 313 and concave trough 316 with respective peaks 314, 315 and bottom 317 in the base. This also improves the sealing in holes which have been cast and have a hole wall profile tapers outwardly in order to provide a casting tool release angle a. The angle β of the perimeter wall should be greater than that of the release angle of the hole in which it is to be used in order to provide increased spring force and contact. Such an arrangement facilitates insertion of the sealing cap into a hole with the base first and can be used in combination with any variation of the base described herein.

Figure 3C:
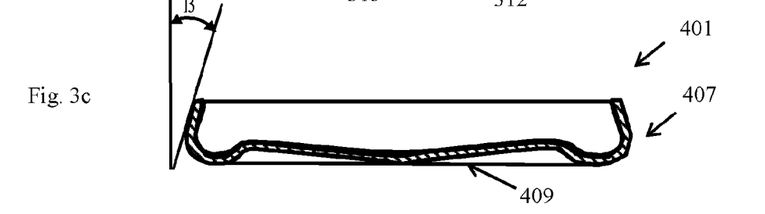
FIG. 3c) shows a section through an additional further embodiment of a sealing cap according to the invention.

FIG. 3c) shows a further embodiment of a sealing cap in accordance with the present invention in which the sealing cap 401 is provided with a perimeter wall 407 which tapers inwards at an angle β from the base 409 to the open end in addition to a corrugated base comprising concave and convex annular corrugations similar to those of the previously described embodiments of the invention. Such an arrangement facilitates insertion of the sealing cap into a hole with the open end first and can be used in combination with any variation of the base described herein.

Figure 3D:
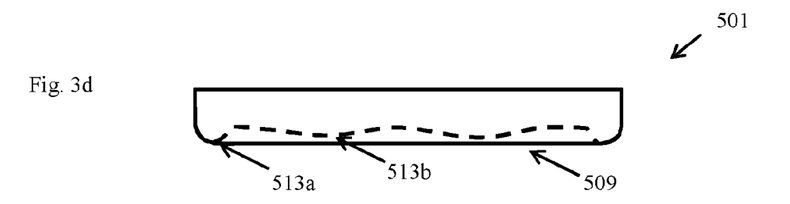
FIG. 3d) shows a lateral view of another embodiment of a sealing cap according to the invention.

FIG. 3d) shows a lateral view of a further embodiment of a sealing cap in accordance with the present invention in which the sealing cap 501 has a base 509 which is provided with a plurality of concentric ridges 513a, 513b. Such an arrangement facilitates adjustment of the lateral spring force provided by the base and can be used in combination with any variation of the perimeter wall described herein.

Figure 3E:
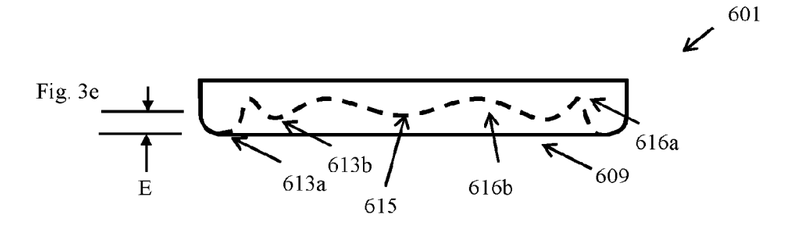
FIG. 3e) shows a lateral view of yet another embodiment of a sealing cap according to the invention.

FIG. 3e) shows a lateral view of a further embodiment of a sealing cap in accordance with the present invention in which the sealing cap 601 has base 609 which is provided with a plurality of concentric convex ridges 613a, 613b, a convex peak 615 and a plurality of concave troughs 616a, 616b. Troughs 616a, 616b may project inwards a depth E which is more than 50% of the height of the sealing cap. Such an arrangement facilitates adjustment of the lateral spring force provided by the base and can be used in combination with any variation of the perimeter wall described herein.

Figure 3F:
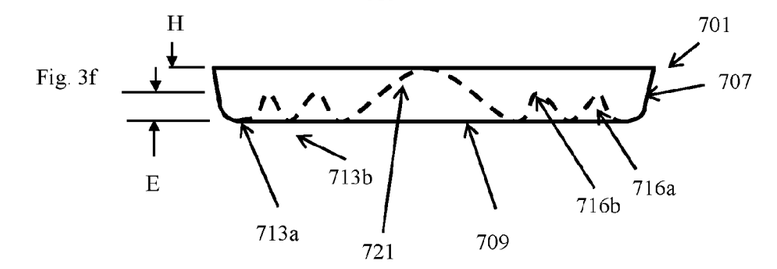
FIG. 3f) shows a lateral view of an additional other embodiment of a sealing cap according to the invention.

FIG. 3f) shows a lateral view of a further embodiment of a sealing cap in accordance with the present invention in which the sealing cap 701 has base 709 which is provided with a plurality of concentric ridges 713a, 713b, a peak 721 and a plurality of troughs 716a, 716b. Troughs 716a, 716b project inwards a depth E which is more than 50% of the height H of the sealing cap and peak 721 extends to the height of the perimeter wall 707. Such an arrangement can be used to determine how the lateral spring force provided by the base varies as the pressure exerted on the base varies and can be used in combination with any variation of the perimeter wall described herein.

Figure 4:
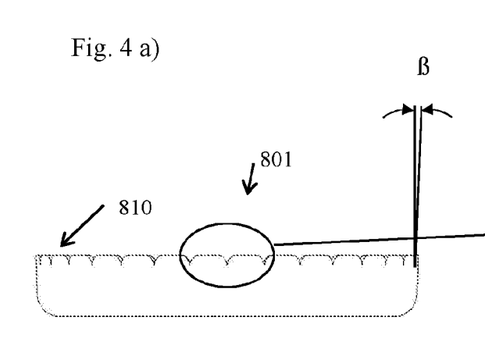

FIGS. 4a) to 4c) show a lateral, perspective from above, and a cross-section through a further embodiment of a sealing cap 801 in accordance with the present invention. This embodiment is similar to the sealing cap shown in FIG. 3b) in that the sealing cap 801 is provided with a perimeter wall 807 which tapers outwards at the angle β from the plane of the base 809. It is further provided in the base with an arrangement of convex ridges 812, 813 with respective peaks 814, 815 and a concave trough 816 with a bottom 817 arranged between the ridges. The angle β of the perimeter wall should be greater than that of the release angle of the hole in which it is to be used in order to provide increased spring force and contact. Such an arrangement facilitates insertion of the sealing cap into a hole with the base first and can be used in combination with any variation of the base described herein. During insertion into the hole the rubber material at the open end 808 of the side wall of the sealing cap may be pinched between the metal of the sealing cap and the circumference of the hole, this may cause small sections or even a complete ring of the rubber material to be cut off the sealing cap if the sealing cap is fully inserted into the hole. Such debris is undesirable and in order to prevent this, the open end of the side wall of the sealing cap 801 is provided with means 823 to reduce its rigidity. This allows the open end to bend inwards towards the centre of the sealing cap and reduces the shearing force on the rubber material, thereby preventing it from being cut off. As shown in FIGS. 4a) to 4d) the means to reduce the rigidity of the open end of the side wall 823 can be in the form of a scalloped edge 810 in which vertical cuts 823 are made into the side wall and the open ends of the cuts rounded. As shown in the magnified image of a scalloped edge in FIG. 4d) the top edge 814 of each scalloped portion is substantially straight. The height of each vertical cut preferably is equal to or less than 50% of the height of the side wall, more preferably equal to or less than 30% of the height of the side wall, even more preferably equal to or less than 20% of the height of the side wall and most preferably equal to or less than 10% of the height of the side wall.

FIG. 4e) shows a further embodiment of means to reduce the rigidity of the open end of the side wall of a sealing cap. In this embodiment of the invention, the means to reduce the rigidity of the open end of the side wall of a sealing cap comprises a plurality of tapered slits 823' in the side wall. The height of each slit preferably is equal to or less than 50% of the height of the side wall, more preferably equal to or less than 30% of the height of the side wall, even more preferably equal to or less than 20% of the height of the side wall and most preferably equal to or less than 10% of the height of the side wall.

FIG. 4f) shows a further embodiment of means to reduce the rigidity of the open end of the side wall of a sealing cap. In this embodiment of the invention the means to reduce the rigidity of the open end of the side wall of a sealing cap is formed by providing the top edge of the side wall with a wave-like profile formed of curved projections 823". The height of the crest to trough of each of the curved projections 823" preferably is equal to or less than 50% of the height of the side wall, more preferably equal to or less than 30% of the height of the side wall, even more preferably equal to or less than 20% of the height of the side wall and most preferably equal to or less than 10% of the height of the side wall.

FIG. 4g) shows a further embodiment of means to reduce the rigidity of the open end of the side wall of a sealing cap. In this embodiment of the invention the means to reduce the rigidity of the open end of the side wall of a sealing cap is formed by providing the top edge of the side wall with a castellated profile formed of quadratic projections 823'". The height of each quadratic projection 823'" preferably is equal to or less than 50% of the height of the side wall, more preferably equal to or less than 30% of the height of the side wall, even more preferably equal to or less than 20% of the height of the side wall and most preferably equal to or less than 10% of the height of the side wall. Preferably the gap between each projection is equal to or smaller than the width of each projection in order to avoid reducing the rigidity of the open wall too much as a large reduction will reduce the force retaining the sealing cap in the hole into which it is fitted. Of course, if it is desired to reduce the retaining force, the width of the gaps can be made larger than the width of each projection.

A further means to reduce the rigidity of the open end of the side wall of a sealing cap (not shown) could comprise reducing the thickness of the open end of the side wall. The reduction in thickness preferably is equal to or less than 50% of the thickness of lower part of the side wall, more preferably equal to or less than 30% of the lower part of the side wall, even more preferably equal to or less than 20% of the lower part of the side wall and most preferably equal to or less than 10% of the lower part of the side wall.

Any embodiment of a sealing cap in accordance with the present invention may be provided with means to reduce the rigidity of the open end of the side wall of a sealing cap.

The corrugations in the metal base of the sealing caps may be arranged to provide a lateral/radial spring force when the sealing cap is pressed with an interference fit into a hole with the open face of the sealing cap facing away from the direction from which any increased pressure is expected to reign. This lateral force causes the wall of the sealing cap to be firmly pressed against the wall of the hole, thereby resisting forces attempting to eject the sealing cap from the hole. Furthermore the corrugations are preferably arranged such that if a higher pressure is expected to prevail on one side of the sealing cap then the force exerted on the exterior of base of the sealing cap by this higher pressure will act on the corrugations in the base to increase the lateral force holding the sealing cap in position. This has the desirable consequence that the sealing force increases with increasing internal pressure.

Alternatively, if a sealing cap is intended to mounted with the open end facing towards the direction from which any increased pressure is expected to reign then the corrugations are preferably arranged to ensure that increased pressure on the interior of the base of the sealing cap will cause an increase in the lateral force holding the sealing cap in place.

The rubber coating of the sealing cap wall fills the roughness in the contact area between the wall of the sealing cap and the wall of the hole and thereby ensures that the hole is sealed. The lateral spring force provided by the metal does not decrease substantially over time and it compensates for any compression set in the rubber over time, thereby ensuring that the sealing cap maintains a seal over a long period of time. Thus the rubber coating can be made significantly thinner than in prior art sealing caps (where the rubber acts as a spring to compensate for machining tolerances, temperature changes, etc.) as it has the sole function of providing a seal, while in the prior art sealing caps in addition to providing a seal the rubber coating also had to be thick enough to provide a lateral spring force sufficiently high enough to retain the sealing cap in the hole.

Preferably in all embodiments of sealing cap according to the present invention the body is made from a sheet or coil of aluminium or aluminium alloy or steel or stainless steel or other metal covered on at least the portions which will correspond to the external wall of a subsequently formed sealing cap with a resilient polymer or elastomer coating, such as a rubber, which is attached to the metal to form a composite material having a substrate and integral coating. Preferably the whole of the major surface of the sheet or coil which will form the outer surface of the sealing cap is covered with the resilient coating. The sealing cap is subsequently stamped, pressed or otherwise formed out of the sheet or coil composite material. The means to reduce the rigidity of the open end of the side wall of a sealing cap may be formed at the same time as the sealing cap is stamped, pressed or otherwise formed out of the sheet or coil composite material, or the means may be formed after that operation.

Preferably such a sheet or coil of steel has a thickness of steel which is greater or equal to 0.1 mm and less than or equal to 0.5 mm. More preferably the thickness of the steel is greater than or equal to 0.15 mm and less than or equal to 0.3 mm. Most preferably the thickness of the steel is greater than or equal to 0.15 mm and less than or equal to 0.25 mm. Such steel thicknesses give low weight and good spring characteristics. The thinness of the sheet or coil allows the seal cap to be deformed relatively easily thus preventing or reducing the risk of damage to the rubber coating or the material surrounding the hole from cracking while still providing a good seal.

Preferably such a sheet or coil of aluminium or aluminium alloy has a thickness of aluminium which is greater than or equal to 0.2 mm and less than or equal to 0.9 mm. More preferably the thickness of the aluminium is greater than or equal to 0.25 mm and less than or equal to 0.7 mm. Most preferably the thickness of the aluminium is greater than or equal to 0.3 and less than or equal to 0.45 mm. In the event that the sealing cap is to be used in a hot environment the aluminium is preferably from the 2000 or 7000 series which does not relax with prolonged heating.

Preferably the coating has a thickness which is greater than or equal to 0.02 mm and less than or equal to 0.5 mm. More preferably the rubber has a thickness which is greater than or equal to 0.1 mm and less than or equal to 0.4 mm. Most preferably the rubber has a thickness which is greater than or equal to 0.2 mm and less than or equal to 0.3 mm. Such rubber thicknesses give good sealing properties, good resistant to abrasion during insertion into a receiving hole and limited compression set.

While the invention has been illustrated by examples in which the exterior surface of the sealing cap is substantially completely covered by the resilient coating, in order to form a seal it is only necessary for the wall of the sealing cap to be coated with the resilient coating. it is therefore possible to remove (or avoid applying) the resilient coating from areas which are not intended to be in contact with the surface against which a seal is to be made.

A sealing cap in accordance with the present invention may be provided with a substrate of other elastically-deformable materials such as other metals and alloys, and/or polymers and/or a fibre reinforced composite material.

A method for making a sealing cap in accordance with the present invention comprises the steps of:

coating a substrate of elastically-deformable material, for example, steel or aluminium with a first Young's modulus with a coating layer of resilient material with a lower Young's modulus and, subsequently stamping, punching or pressing out a sealing cap with a perimeter wall and a corrugated base.

A further method for making a sealing cap in accordance with the present invention comprises the steps of:

coating a substrate of elastically-deformable material, for example, steel or aluminium with a first Young's modulus with a solution of resilient material with a lower Young's modulus, allowing the solvent to evaporate, optionally vulcanising the resilient material, and, subsequently stamping or punching or pressing or hydroforming or by other methods a sealing cap with a perimeter wall and a corrugated base.

Another further method for making a sealing cap in accordance with the present invention comprises the steps of:

providing a major surface of a substrate of elastically-deformable material, for example, steel or aluminium with a first Young's modulus with a bonding agent, applying a film of resilient material with a lower Young's modulus, over the bonding agent-coated major surface, optionally subjecting the substrate to heat and or pressure for the time necessary to ensure complete bonding between the substrate and film, and, subsequently stamping, punching or pressing out a sealing cap with a perimeter wall and a corrugated base.

A further method for making a sealing cap in accordance with the present invention comprises the additional further step of forming a lip on the perimeter wall. This may be achieved by pressing, rolling or any other suitable method.

The above description of the present disclosure is provided for the purpose of illustration, and it would be understood by those skilled in the art that various changes and modifications may be made without changing the concept and essential features of the present disclosure. Thus, it is clear that the above-described embodiments are illustrative in all aspects and do not limit the present disclosure. For example, while the sealing cap of the invention has been illustrated by embodiments comprising round bodies, it is conceivable that sealing caps in accordance with the present invention are formed with bodies which are oval, triangular, quadratic or polygonal or irregular in shape. Additionally, while the outermost ridge is shown contiguous with the wall, it is also possible for it to be adjacent the wall but separated from it by a flange which is substantially perpendicular to the wall.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. Sealing cap (1) with body (3) with a U-shaped cross-section with a base (9) and a perimeter wall (7) of height H characterised in that it is made of an elastically-deformable substrate (4) made of a material with a first Young's modulus, the perimeter wall comprising an open end provided with means (823-823''') to reduce a rigidity of the open end;
   wherein the elastically-deformable substrate is coated at least on an exterior of the perimeter wall with a layer of a resilient material (5) with a second Young's modulus, wherein the second Young's modulus is lower than the first Young's modulus, the base (9) is provided with a continuous convex ridge (12) adjacent the perimeter wall, the continuous convex ridge surrounds at least one concave trough (16) and characterised in that said at least one concave trough surrounds a further convex ridge (13), wherein the perimeter wall is configured without a contiguous aperture positioned in the perimeter wall away from an edge of the perimeter wall.

2. Sealing cap according to claim 1 wherein the means (823-823") to reduce the rigidity of the open end comprises at least one of vertical slits (823; 823') in the open end, a curved profile (823") to the open end, a castellated profile to the open end, or a reduction in a thickness of the material forming the open end.

3. Sealing cap according to claim 1 wherein a centre portion (21) of the base is substantially flat.

4. Sealing cap according to claim 1 wherein the layer of resilient material is thicker than 0.02 mm and thinner than 0.5 mm.

5. Sealing cap according to claim 1 wherein the layer of resilient material is thicker than 0.1 mm and thinner than 0.4 mm.

6. Sealing cap according to claim 1 wherein the layer of resilient material is thicker than 0.2 mm and thinner than 0.3 mm.

7. Sealing cap according to claim 1 wherein the layer of resilient material is a rubber.

8. Sealing cap according to claim 1 wherein the layer of resilient material covers substantially all of the exterior of the perimeter wall.

9. Sealing cap according to claim 1 wherein the elastically-deformable substrate is formed of steel, stainless steel, aluminium, aluminium alloy, or a combination thereof.

10. Sealing cap according to claim 1 wherein the elastically-deformable substrate is formed of a polymer and/or a fibre-reinforced composite material.

11. Sealing cap according to claim 1 wherein the elastically-deformable substrate is made of aluminium or aluminium alloy, and wherein a thickness of the elastically-deformable substrate is greater than or equal to 0.2 mm and less than or equal to 0.9 mm.

12. Sealing cap according to claim 1 wherein a thickness of the elastically-deformable substrate is greater than or equal to 0.25 mm and less than or equal to 0.7 mm.

13. Sealing cap according to claim 1 wherein a thickness of the elastically-deformable substrate is greater than or equal to 0.3 mm and less than or equal to 0.45 mm.

14. Sealing cap according to claim 1 wherein the elastically-deformable substrate is made of steel, and wherein a thickness of the steel is greater or equal to 0.1 mm and less than or equal to 0.5 mm.

15. Sealing cap according to claim 14 wherein the thickness of the steel is greater than or equal to 0.15 mm and less than or equal to 0.3 mm.

16. Sealing cap according to claim 14 wherein the thickness of the steel is greater than or equal to 0.15 and less than or equal to 0.25 mm.

17. Sealing cap according to claim 1 wherein a depth E of a concave corrugation is less than or equal to a sum of the height H of the perimeter wall and a depth D of a convex corrugation, and is greater than or equal to 10% of the sum of the height of the perimeter wall and the depth of the convex corrugation.

18. Sealing cap according to claim 1 wherein a depth E of a concave corrugation is less than or equal to 50% of a sum of the height H of the perimeter wall and a depth D of a convex corrugation, and is greater than or equal to 20% of the sum of the height of the perimeter wall and the depth of the convex corrugation.

19. Method for manufacturing a sealing cap according to claim 1 characterised by the steps of: coating a substrate of elastically-deformable material, for example, steel or aluminium, that has a first Young's modulus with a coating layer of resilient material which has a lower Young's modulus; and, subsequently stamping, punching or pressing out from the coated substrate a sealing cap with a perimeter wall and a corrugated base.

20. Method for manufacturing a sealing cap according to claim 1 characterised by the steps of:

coating a substrate of elastically-deformable material that has a first Young's modulus with a solution of resilient material that has a lower Young's modulus;

allowing the solvent of said solution to evaporate; optionally vulcanising the resilient material; and, subsequently stamping, punching or pressing out from the coated substrate a sealing cap with a perimeter wall and a corrugated base.

21. Method for manufacturing a sealing cap according to claim 1 characterised by the steps of:

providing a major surface of a substrate of elastically-deformable material, which has a first Young's modulus, with a bonding agent;

applying a film of resilient material with a lower Young's modulus, over the bonding agent-coated major surface, optionally subjecting the substrate and/or film to heat and/or to pressure for the time necessary to ensure complete bonding between the substrate and film; and, subsequently stamping, punching or pressing out from the coated substrate a sealing cap with a perimeter wall and a corrugated base.

* * * * *